June 4, 1929.　　　E. E. JOHNSON　　　1,716,138
COUPLING AND METHOD OF MAKING THE SAME
Filed Oct. 18, 1923　　　2 Sheets-Sheet 1

INVENTOR:
EDWARD E. JOHNSON.
BY Whiteley and Ruckman
ATTORNEYS.

June 4, 1929.   E. E. JOHNSON   1,716,138
COUPLING AND METHOD OF MAKING THE SAME
Filed Oct. 18, 1923   2 Sheets-Sheet 2
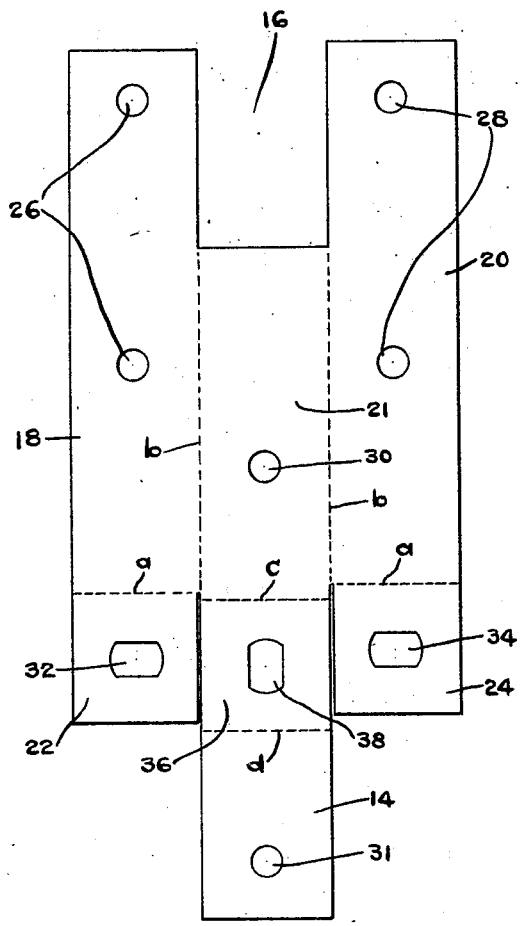
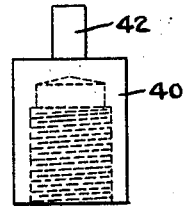
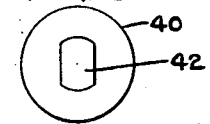
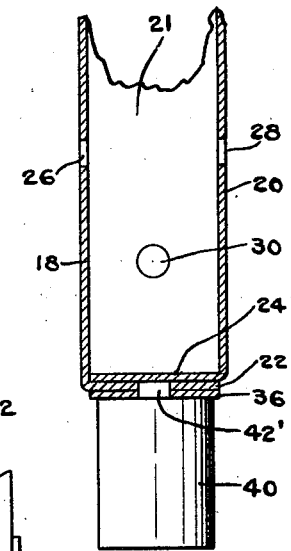
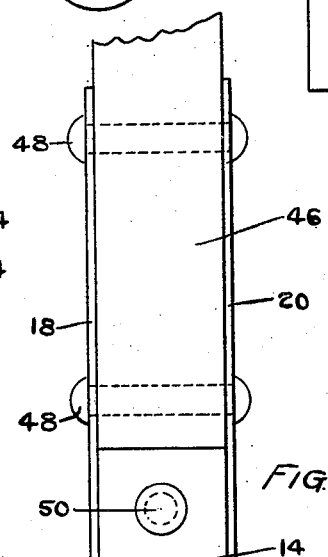
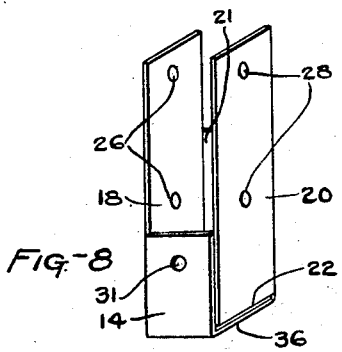
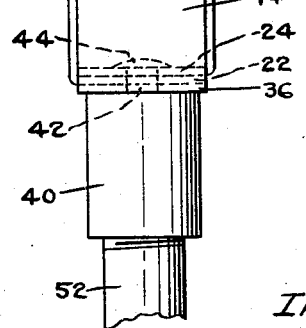
INVENTOR:
EDWARD E. JOHNSON.
BY Whiteley and Ruckman
ATTORNEYS.

Patented June 4, 1929.

1,716,138

UNITED STATES PATENT OFFICE.

EDWARD E. JOHNSON, OF ST. PAUL, MINNESOTA.

COUPLING AND METHOD OF MAKING THE SAME.

Application filed October 18, 1923. Serial No. 669,442.

My invention relates to couplings and methods of making the same, and has for an object to provide a coupling having wings adapted to clasp and be secured to wooden rods or shafts such as pump rods. My improved method broadly considered consists in providing a sheet metal blank having a projecting portion at one end thereof, and bending the blank in such manner as to form a plurality of wings rectangularly disposed which provides a socket for surrounding the end portion of the wooden rod.

The full objects and advantages of my invention will appear in connection with the detailed description, and the novel features of my inventive idea will appear in connection with the claims.

Figure 1:
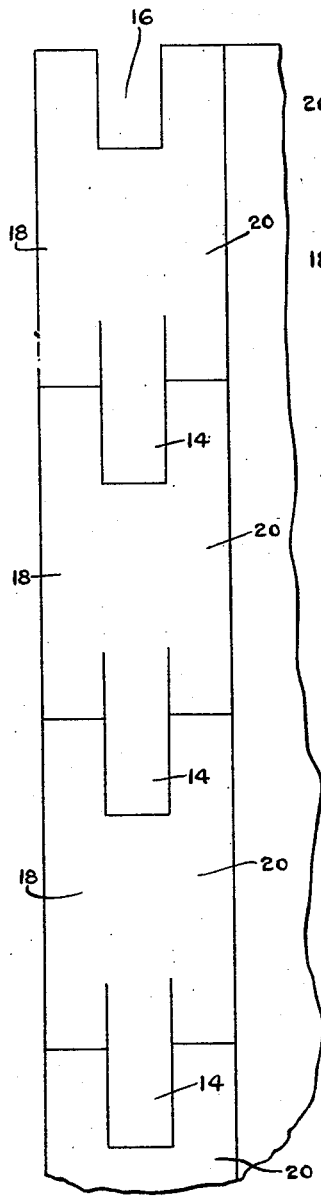
Figure 3:
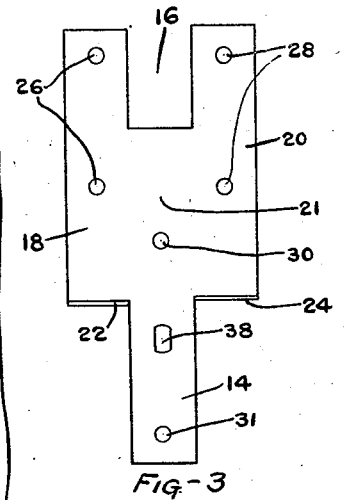
Figure 4:
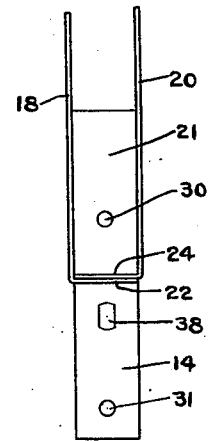
Figure 5:
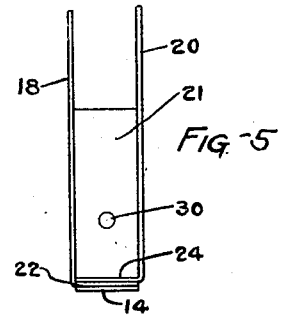
Figure 6:
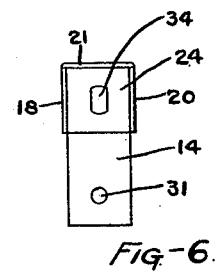
Figure 7:
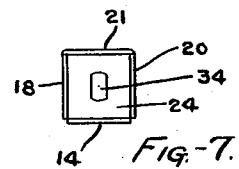

In the accompanying drawings which illustrate successive stages in the manufacturing of my coupling, Fig. 1 is a plan view showing a piece of sheet metal broken away and illustrating the manner of cutting coupling blanks therefrom without waste of material. Fig. 2 is an enlarged plan view showing a blank provided with holes and illustrating by dotted lines the lines upon which the blank is to be bent. Fig. 3 is a plan view showing the blank partly bent into shape. Fig. 4 is a plan view showing the blank still further bent into shape. Fig. 5 is a plan view showing the blank still further bent into shape. Fig. 6 is a view of the structure shown in Fig. 5, but looking from above. Fig. 7 is a view looking from above showing the blank completely bent into shape. Fig. 8 is a view in so-called perspective showing the blank completely bent into shape. Fig. 9 is a side elevational view of a tubular attaching member which may be employed to secure together the overlapped portions of the coupling. Fig. 10 is a plan view of said tubular member. Fig. 11 is an elevational view showing the coupling attached to the contiguous ends of two rods for connecting these rods together. Fig. 12 is a sectional elevational view showing the overlapped portions of the coupling secured in a slightly different manner.

In carrying out my invention, blanks are cut from sheet metal, these blanks being preferably cut out in the manner shown in Fig. 1 in order that material may be not wasted. Each blank is cut with a projecting portion 14 at one end whereby a recess 16 is produced at the adjacent end of the succeeding blank so that one end of the blank will be re-entrantly cut. The blank outside the lines connecting the limiting margin of the projecting portion 14 and recess 16 has side members 18 and 20 which at their ends adjacent the projection 14 are cut free from the middle portion 21 of the blank whereby bottom portions or projections 22 and 24 are produced. As will be apparent from Fig. 2, a narrow strip of material is preferably removed along the line of cut last mentioned in order to provide clearance when the blank is bent. As will be apparent from Fig. 2, the side members 18 and 20 are slightly off-set longitudinally with relation to each other for a purpose which will presently appear. The side members 18 and 20 are provided respectively with pairs of holes 26 and 28 and the middle member 21 is provided with a hole 30, while the projection 14 is provided with a hole 31. The bottom members 22 and 24 are provided with elongated openings 32 and 34, while the portion 36 of the middle member is provided with an elongated opening 38 extending at right angles to the openings 32 and 34. In bending the blank into shape, the following order is preferably followed. The bottom members 22 and 24 are first bent up at right angles on the lines $a$ as indicated in Fig. 2 to form the shape shown in Fig. 3. The side members 18 and 20 are then bent up at right angles on the lines $b$ to form the shape shown in Fig. 4. The slight off-setting previously mentioned permits the members 22 and 24 to over-lap as shown in this latter figure. The middle member is then bent up on the line $c$ to form the shape shown in Figs. 5 and 6, the latter view showing the shape as it appears looking down on the structure shown in Fig. 5. The projection 14 is then bent up on the line $d$ to form the shape shown in Figs. 7 and 8. It will be noted that when the blank has been thus bent on lines parallel with the margins of the blank, the side members 18 and 20, the middle member 21 and the projection 14 form wings which are so arranged as to produce an enclosing rectangular structure in the nature of a socket. The overlapping members 24, 22, and 36 may be secured together in any suitable manner to complete the coupling. For this purpose, a tubular attaching member 40 shown in Figs. 9 and 10 may be employed. This member is internally threaded and its closed end is provided with an axially extending lug 42 which is properly shaped to fit into the registering openings 34, 32, and 38. The lug is then headed down as indicated at 44 in Fig. 11, the shape of the lug and elongated openings preventing relative turning of the parts. In Fig. 12, the overlapping members are shown secured together in a slightly different manner. The lug 42' in this instance extends only through the members 22 and 36. The member 24 is, therefore, in this form of the invention left without any opening so that the end of the lug 42' butts against the surface of this member. The member 40 is secured by welding to the overlapping members. As shown in Fig. 11, the coupling is secured to a square wooden rod 46 by rivets 48 passing through the holes in the wings 18 and 20 and by a rivet 50 passing through the holes in the wings 14 and 21. The attaching member 40 is used to connect the rod 46 to another rod. In the construction shown in Fig. 11, the externally threaded end of a metal rod 52 is screwed into the internally threaded portion of the member 40. My method provides a very strong and effective coupling which can be economically manufactured from sheet metal and which is less liable to break in use than are castings since the rolled or drawn metal which I employ is tough and durable enough to permit considerable flexing without breaking.

I claim:

1. The method of making couplings which consists in cutting from sheet metal, a blank cut re-entrantly at one end and having a projecting portion at the other end, cutting the side members of the blank free from the middle portion thereof in line with the edges of said projecting portion for part of the distance toward the re-entrant cut, forming elongated transversely extending openings in said free portions and an elongated longitudinally extending opening in that part of the middle portion which lies between said free portions, bending said free portions at right angles to said side members, bending said side members at right angles to said middle portion, bending that part of the middle portion which lies between said free portions at right angles to the remainder of the middle portion, bending said projecting portion at right angles to said last mentioned bent portion, and securing together the overlapping bottom portions of the coupling by means of a rod attaching member having an elongated lug fitting into said elongated openings.

2. A coupling in the form of a socket comprising a single piece of metal having a bottom member, two oppositely positioned side members integral with said bottom member and extending up at right angles thereto, two oppositely positioned side members integral with one of said first mentioned side members and extending at right angles to said bottom member to complete the socket, and additional bottom members integral with said last mentioned side members and extending at right angles thereto, said additional bottom members being juxtaposed with relation to each other and with relation to said first mentioned bottom member.

3. A coupling comprising a single piece of metal having three bottom members juxtaposed with relation to each other, four side members extending at right angles to each other and at right angles to said bottom members to form a socket, and a rod attaching member securing said bottom members together.

4. A coupling having a plurality of bottom members juxtaposed with relation to each other, four side members extending at right angles to each other successively and at right angles to said bottom members to form a socket, and a rod attaching member securing said bottom members together.

5. A coupling having a plurality of bottom members juxtaposed with relation to each other, four side members extending at right angles to each other successively and at right angles to said bottom members to form a socket, and a rod attaching member extending out from said bottom members.

In testimony whereof I hereunto affix my signature.

EDWARD E. JOHNSON.